US006846849B2

(12) United States Patent
Capps

(10) Patent No.: US 6,846,849 B2
(45) Date of Patent: Jan. 25, 2005

(54) SACCHARIDE-BASED RESIN FOR THE PREPARATION OF FOAM

(75) Inventor: Charles L. Capps, Little Rock, AR (US)

(73) Assignee: Temple-Inland Forest Products Corporation, Austin, TX (US)

( * ) Notice: Subject to any disclaimer, the term of this patent is extended or adjusted under 35 U.S.C. 154(b) by 33 days.

(21) Appl. No.: 10/342,484

(22) Filed: Jan. 15, 2003

(65) Prior Publication Data

US 2003/0114585 A1 Jun. 19, 2003

Related U.S. Application Data

(63) Continuation-in-part of application No. 10/279,326, filed on Oct. 24, 2002, and a continuation-in-part of application No. PCT/US02/34055, filed on Oct. 24, 2002
(60) Provisional application No. 60/335,945, filed on Oct. 24, 2001.

(51) Int. Cl.[7] .............................. C08J 3/00; C08K 3/20; C08L 75/00; C08G 18/00; C08H 5/04
(52) U.S. Cl. ................... 521/84.1; 521/109.1; 521/137; 521/155; 521/161; 521/170; 521/175; 524/589; 524/590; 524/591; 524/839; 524/840; 527/103; 527/301; 527/401; 528/44; 528/73; 528/76; 528/85
(58) Field of Search ................................. 524/589, 590, 524/591, 839, 840; 528/44, 73, 76, 85; 521/84.1, 109, 137, 155, 161, 170, 175; 527/301, 103, 401

(56) References Cited

U.S. PATENT DOCUMENTS

| | | | |
|---|---|---|---|
| 3,637,539 A | 1/1972 | Wolff et al. .................. 260/2.5 |
| 3,666,593 A | 5/1972 | Lee ............................ 156/285 |
| 3,747,037 A | 7/1973 | Earing .......................... 336/96 |
| 3,870,665 A | 3/1975 | Diehr et al. ............... 260/17.2 |
| 3,919,173 A | 11/1975 | Coyner et al. ............... 260/77.5 |
| 3,923,926 A | 12/1975 | Harada et al. ............. 260/77.5 |
| 4,100,328 A | 7/1978 | Gallagher .................. 428/407 |
| 4,123,412 A | 10/1978 | Fukuda et al. ............ 260/30.8 |
| 4,143,014 A | 3/1979 | McLaughlin et al. ...... 260/29.2 |
| 4,169,826 A | 10/1979 | Gilbert et al. ............. 260/33.6 |
| 4,257,817 A | 3/1981 | Mathur et al. .............. 106/266 |
| 4,257,995 A | 3/1981 | McLaughlin et al. ....... 264/122 |
| 4,291,129 A * | 9/1981 | Kennedy |
| 4,314,916 A | 2/1982 | Blount ........................ 260/13 |
| 4,316,745 A | 2/1982 | Blount .................. 106/287.34 |
| 4,317,752 A | 3/1982 | Blount ........................ 521/159 |
| 4,323,494 A | 4/1982 | Blount ....................... 524/858 |
| 4,324,864 A | 4/1982 | Blount ....................... 521/100 |
| 4,328,136 A | 5/1982 | Blount ....................... 523/204 |
| 4,337,710 A | 7/1982 | Haataja et al. ............. 108/53.3 |
| 4,357,430 A | 11/1982 | VanCleve ................... 521/128 |
| 4,359,507 A | 11/1982 | Gaul et al. ............... 428/425.1 |
| 4,361,662 A | 11/1982 | Gaul et al. .................... 524/14 |
| 4,377,646 A | 3/1983 | Blount ....................... 521/154 |
| 4,378,441 A | 3/1983 | Blount ....................... 521/154 |
| 4,393,019 A | 7/1983 | Geimer ........................ 264/83 |
| 4,414,361 A | 11/1983 | Gaul et al. .................. 524/702 |
| 4,427,002 A | 1/1984 | Baron et al. ................. 128/83 |
| 4,486,557 A | 12/1984 | Gaul et al. .................. 523/446 |
| 4,490,518 A | 12/1984 | Fuzesi et al. ............... 527/401 |
| 4,517,147 A | 5/1985 | Taylor et al. ................. 264/83 |
| 4,521,544 A * | 6/1985 | Kennedy |
| 4,525,321 A | 6/1985 | Tonniges .................... 264/517 |
| 4,530,777 A * | 7/1985 | Kennedy |
| 4,546,039 A | 10/1985 | Horacek et al. ............ 428/357 |
| 4,609,513 A | 9/1986 | Israel ......................... 264/122 |
| 4,617,223 A | 10/1986 | Hiscock et al. ............. 428/211 |
| 4,652,595 A | 3/1987 | Peters et al. ................. 523/315 |
| 4,684,489 A | 8/1987 | Walter ........................ 264/101 |
| 4,692,292 A | 9/1987 | Kollmeier et al. .......... 264/126 |
| 4,692,479 A | 9/1987 | Schneider et al. .......... 523/209 |
| 4,720,513 A | 1/1988 | Kameyama et al. ........ 523/203 |
| 4,752,637 A | 6/1988 | Israel ......................... 524/702 |
| RE32,801 E | 12/1988 | Peters et al. ................ 523/315 |

(List continued on next page.)

FOREIGN PATENT DOCUMENTS

| | | | |
|---|---|---|---|
| CA | 1087825 | 10/1980 | |
| CA | 2043331 | 5/1991 | |
| DE | 27 03 271 A1 | 3/1978 | ........... C08L/75/04 |
| DE | 04331656 | 9/1994 | |
| FR | 2 259 134 | 8/1975 | ........... C08L/75/04 |
| GB | 1387454 | 3/1975 | |
| JP | 60287794 | 6/1987 | |
| JP | 02123006 | 1/1992 | |
| WO | WO 83/02120 | 6/1983 | |
| WO | WO8803090 | 5/1988 | |

OTHER PUBLICATIONS

*Technology of Rice Straw Particleboard Bonded by Urea–Formaldehyde Resin Modified by Isocyanate*, Liu Zhenglian and Hao Bingye, Pacific Rim Bio–Based Composites Symposium, Nov. 1992, pp. 295–302, Beijing Forestry University, Beijing, China.

*Primary Examiner*—Patrick D. Niland
(74) *Attorney, Agent, or Firm*—Conley Rose, P.C.; Rodney B. Carroll

(57) ABSTRACT

An embodiment of the present invention includes a foam prepared from a resin comprising: one or more saccharides; one or more isocyanates; one or more resin polyols; and water. The foam may be for example polyurethane foam or polycyanurate foam, either flexible or rigid. Another embodiment includes a method for preparing a foam comprising: forming a resin by mixing one or more saccharides with one or more isocyanates and then mixing the one or more saccharides and the one or more isocyanates with water; and admixing one or more foam polyols to the resin. Another embodiment includes a method for manufacturing a foam derived from an isocyanate, comprising replacing all or a portion of the isocyanate with a resin comprising: one or more saccharides; one or more isocyanates; one or more resin polyols; and water. Another embodiment includes an article of manufacture comprising such foam.

25 Claims, No Drawings

U.S. PATENT DOCUMENTS

| | | |
|---|---|---|
| 4,801,631 A | 1/1989 | Sachs et al. .................. 524/18 |
| 4,833,182 A | 5/1989 | Israel et al. ................... 524/14 |
| 4,850,849 A | 7/1989 | Hsu .......................... 425/407 |
| 4,898,776 A | 2/1990 | Israel et al. ................. 428/336 |
| 4,906,484 A | 3/1990 | Lambuth et al. ........... 428/326 |
| 4,944,823 A * | 7/1990 | Stofko |
| 5,001,190 A | 3/1991 | Carpenter et al. .......... 524/871 |
| 5,002,713 A | 3/1991 | Palardy et al. .............. 264/109 |
| 5,008,310 A | 4/1991 | Beshay ........................ 524/13 |
| 5,053,274 A | 10/1991 | Jonas ......................... 428/332 |
| 5,075,370 A | 12/1991 | Kubitza et al. ............. 524/591 |
| 5,128,407 A | 7/1992 | Layton et al. .............. 524/839 |
| 5,140,086 A | 8/1992 | Hunter et al. ............... 527/103 |
| 5,143,768 A | 9/1992 | Wilderman et al. ........... 428/68 |
| 5,151,238 A | 9/1992 | Earl et al. ................... 264/136 |
| 5,179,143 A | 1/1993 | Konig et al. ................ 524/35 |
| 5,180,770 A | 1/1993 | Lepori et al. ............... 524/563 |
| 5,183,837 A | 2/1993 | Lepori et al. ................. 524/13 |
| 5,204,176 A | 4/1993 | Seiss et al. ............. 428/304.4 |
| 5,214,081 A | 5/1993 | Lepori et al. ................. 524/35 |
| 5,332,458 A | 7/1994 | Wallick ...................... 156/210 |
| 5,387,642 A | 2/1995 | Blum et al. .................. 524/591 |
| 5,407,980 A | 4/1995 | Pizzi et al. ................... 524/73 |
| 5,426,137 A | 6/1995 | Allen .......................... 523/318 |
| 5,554,330 A | 9/1996 | Flannery et al. ............ 264/113 |
| 5,641,819 A | 6/1997 | Campbell .................... 524/14 |
| 5,648,421 A | 7/1997 | Thiele et al. ............... 524/789 |
| 5,674,568 A | 10/1997 | Layton et al. ........... 427/389.9 |
| 5,750,201 A | 5/1998 | Phanopoulos et al. ...... 427/375 |
| 5,942,058 A | 8/1999 | Sleeter et al. .............. 156/62.2 |
| 5,968,995 A * | 10/1999 | Rizk et al. |
| 6,022,444 A | 2/2000 | Haider et al. ............ 156/331.4 |
| 6,197,912 B1 | 3/2001 | Huang et al. ................. 528/28 |
| 6,287,495 B1 | 9/2001 | Rosthauser ................. 264/109 |

OTHER PUBLICATIONS

*Chemical and Physical Interpretation of MDI Cure in Saturated Steam Environments*, David Harper, Michael Wolcott, Timothy Rials, $2^{nd}$ European Panel Products Symposium, pp. 193–204, Department of Civil and Environmental Engineering, Washington State University, Pullman, Washington.

* cited by examiner

SACCHARIDE-BASED RESIN FOR THE PREPARATION OF FOAM

CROSS-REFERENCE TO RELATED APPLICATIONS

The present application is a continuation in part of U.S. application Ser. No. 10/279,326, and is a C-I-P of PCT application Ser. No. PCT/US02/34055, both of which were filed Oct. 24, 2002, entitled "Saccharide-Based Resin for the Preparation of Composite Products," and each of which claim the benefit of U.S. provisional application Ser. No. 60/335,945, filed Oct. 24, 2001, entitled "Saccharide-Based Resin for the Preparation of Composite Products," each of which is hereby incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates in general to the composition, preparation and application of articles and compounds comprising isocyanate, in particular foams. More particularly, the present invention relates to the composition, preparation and application of a saccharide-based adhesive resin for foam. Even more particularly, the present invention relates to the composition, preparation and application of an adhesive resin containing corn syrup, water, isocyanate and polyol that is useful in the preparation of foam.

2. Background Art

Composite wood products prepared from various lignocellulosic materials (e.g., wood) have been known for centuries, although industrial production began only about a century ago. Among other things, these products offer a relatively low cost and a reasonably high strength to weight ratio. Consequently, they are used in a number of capacities including interior and exterior construction, furniture and even marine applications. Several distinct composite wood products exist including plywood, oriented strand board, particleboard and medium density fiberboard (MDF).

Products such as particleboard and MDF are typically prepared from an adhesive resin composition and comminuted lignocellulosic materials such as wood flakes or wood fibers. The manufacture of particleboard and MDF begins with the reduction of the wood particles to a particulate size or a fiber, which will occasionally be referred to herein as a furnish. This furnish is then blended with an adhesive resin and transported to a forming device, which shapes the mixture into a mat. The mat is then loaded into a heated press that shapes and pressurizes the mat to a desired thickness. The pressure and heat together act to cure the resin, which bonds the mixture into a panel or board. Bonding performance is affected by, among other factors, the amount and type of resin, the curing time and the curing pressure.

The predominant resin systems in the composite wood industry are urea-formaldehyde (UF) and phenol-formaldehyde (PF) resins. Although these formaldehyde-based resins perform consistently, the physical properties of composite wood products prepared with formaldehyde-based resins are often unsatisfactory. For example, the internal bond strength of composite wood products frequently renders them unfit for certain demanding applications. In addition, such products are commonly susceptible to significant swelling upon exposure to moisture. As a consequence of these and other factors, composite wood products prepared with UF and PF resins are often less robust than desired.

Currently, alternatives to formaldehyde-based resins are being investigated. The potentially attractive alternatives include resin systems that employ isocyanates. Such resin systems have been shown to impart markedly improved physical properties to composite wood products. For example, concentrated isocyanate-based resins increase bonding strength, and therefore offer a more robust and durable composite wood product. Unfortunately, isocyanate-based resins also have several known drawbacks that have limited their commercial utility. First, isocyanates are relatively expensive as compared to other resin materials. Consequently, concentrated isocyanate-based resins are uneconomical as compared with traditional formaldehyde-based resins. Second, unlike UF and PF resins, isocyanates are highly reactive with water. Consequently, isocyanates react quickly with any water present in either the wood furnish or the resin itself. This limits both the shelf-life of the resin and the lignocellulosic materials with which it can be used. Third, isocyanates are toxic and their use creates environmental, health and industrial hygiene concerns. Thus, process safety considerations influence against the use of concentrated isocyanate-based resins.

The chemistry of isocyanate binding of lignocellulosic materials is not well understood. However, it is well known that isocyanates react with the hydroxyl moiety on alcohols to give urethanes and that polyisocyanates react with poly-alcohols (hereinafter

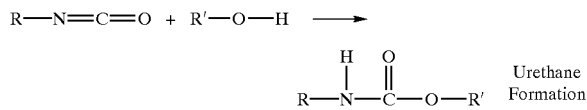

"polyols") to give polyurethanes. Because lignocellulosic materials have surface-terminated hydroxyl groups, it is commonly believed that isocyanates serve as an effective binder by forming urethane linkages with the lignocellulosic materials. It is also well known that isocyanate moieties react with water to yield less reactive ureas and carbon dioxide. Consequently, water is believed to damage the efficacy of the binder by reducing the availability of reactive isocyanate groups.

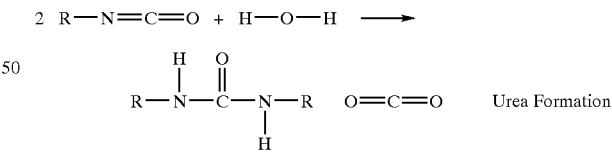

Such isocyanate chemistry is also useful in the formation of other products such as foam, for example polyurethane or polyisocyanurate foams having useful cushioning and insulative properties. The manufacturing industry has a continuing need for more economical compositions and improved safety, for example by reducing the amount of isocyanate used in the manufacture of products such as foam, as may be achieved in accordance with the present invention.

SUMMARY OF THE PREFERRED EMBODIMENTS

An embodiment of the present invention includes a foam prepared from a resin comprising: one or more saccharides;

one or more isocyanates; one or more resin polyols; and water. The foam may be for example polyurethane foam or polycyanurate foam, either flexible or rigid. Another embodiment includes a method for preparing a foam comprising: forming a resin by mixing one or more saccharides with one or more isocyanates and then mixing the one or more saccharides and the one or more isocyanates with water; and admixing one or more foam polyols to the resin. Another embodiment includes a method for manufacturing a foam derived from an isocyanate, comprising replacing all or a portion of the isocyanate with a resin comprising: one or more saccharides; one or more isocyanates; one or more resin polyols; and water. Another embodiment includes an article of manufacture comprising a foam prepared from a resin comprising: one or more saccharides; one or more isocyanates; one or more resin polyols; and water.

DESCRIPTION OF THE PREFERRED EMBODIMENTS

The preferred embodiments of the present invention stem from the discovery that an appropriate resin composition of saccharide, isocyanate, polyol and water overcomes many of the prior art limitations of isocyanate-containing adhesive resins without sacrificing their superior bond strength. In particular, suitable and even extraordinary binding can be achieved with resins having very low concentrations of isocyanate by using a saccharide, such as corn syrup, as a primary resin ingredient. It is believed that the polyol acts to retard the reaction between isocyanate and water, thereby increasing the shelf-life of the resin.

As is described below, the resin is useful for lignocellulosic, cellulosic and non-cellulosic materials. Lignocellulosic materials typically are comprised of cellulose, hemicellulose and lignin. Without limiting the scope of the invention, lignocellulosic materials include woody biomass, energy crops, and wood construction materials. The present resin is also useful with non-cellulosic materials. Without limiting the scope of the present invention, non-cellulosic materials include plastics, polyurethanes, organic polymer systems and some metals.

According to this disclosure and the examples set forth herein, a resin prepared from appropriate relative quantities of saccharide, isocyanate, polyol and water allows the manufacture of composite products having desired physical properties. Typically, water is used to adjust the final solids contents of the resin composition to achieve a resin that meets the requirements for processing equipment used in product manufacturing. As used herein, solids content refers to the weight percentage of resin components other than water (i.e., resin solids) to the total weight of the resin (i.e., resin solids and water).

Isocyanates useful in the current invention include those that perform as suitable building blocks in polyurethane chemistry such as aromatic, aliphatic, or cycloaliphatic polyisocyanates having at least two active isocyanate groups per molecule. The isocyanate utilized in the testing below is Mondur 541, a commercially available diphenylmethane diisocyanate, a polyisocyanate. However, a person of ordinary skill in the art will immediately recognize that numerous chemicals may be used as the isocyanate in the present invention. Without limiting the scope of the invention, representative examples include 2,4- and 2,6-diisocyanatotoluene (TDI) and their derivatives; methylenediphenyl 4,4'-, 2,4- and 2,2'-diisocyanates (MDI) and their derivatives; industrial products which may additionally comprise products having more than one ring (polymeric MDI's or PMDI); 1,5-naphthalene diisocyanate (NDI); 4,4',4"-triisocyanatotriphenylmethane and bis(3,5-diisocyanato-2-methylphenyl)methane; 1,6-hexamethylene diisocyanate (HDI); and 3-isocyanatomethyl-3,5,5-trimethylcyclohexyl (isophorone) isocyanate (IPDI). Many such isocyanates are available commercially. For example, commercially available isocyanates include, but are not limited to, IsoBind 1088 (Dow Chemical), Isonate 143L (Dow Chemical), PAPI (Dow Chemical), Mondur 541 (Bayer), Lupranate (BASF), and Rubinate (ICI/Huntsman). Furthermore, basic polyisocyanates may also be modified by bi- or trimerization to produce carbodiimides, uretdiones, biurets, and allophanates. The one or more isocyanates are preferably present in the resin composition in an amount ranging from about 1 to about 30 weight percent of the resin, more preferably from about 2 to about 20 weight percent of the resin, and most preferably from about 5 to about 20 weight percent of the resin.

The term "polyol" in the present invention is defined as a compound having at least two hydroxyl groups capable of reacting with a polyisocyanate. The polyol utilized in the testing below is 1,2-propylene glycol, a relatively simple molecule having two hydroxyl groups. However, a person of ordinary skill in the art will immediately recognize that numerous chemicals may be used as the polyol in the present invention. Without limiting the scope of the invention, representative examples include ethylene glycol; 1,3-propylene glycol; hexane 1,6-diol; 2 methyl-1,3-propanediol; glycerol; mannitol; sorbitol; diethylene glycol; triethylene glycol; polyethylene glycols; polypropylene glycols; and butylene, dibutylene, and polybutylene glycols. The one or more polyols are preferably present in the resin composition in an amount ranging from about 1 to about 10 weight percent of the resin, more preferably from about 2 to about 10 weight percent of the resin, and most preferably from about 3 to about 5 weight percent of the resin.

Saccharides are members of the carbohydrates family, a class of molecules comprising polyhydroxyaldehydes and polyhydroxyketones. Saccharides range from relatively small, simple monosaccharides such as glucose to much larger, more complex polysaccharides such as cellulose. A common aspect of all saccharides is the presence of multiple hydroxyl groups and at least one aldehyde or ketone functionality. The saccharide utilized in the testing below is corn syrup, a mixture of various chain length saccharides produced by hydrolyzing the polysaccharides in corn starch. Corn syrup contains aldohexoses, ketohexoses, and a number of other saccharides that contain varying numbers of hydroxyl, aldehyde and ketone groups. Corn syrup is the only saccharide mixture utilized in the examples below. However, one of ordinary skill in the art will understand that references to corn syrup are exemplary only and that other saccharides and saccharides mixtures may perform equally well or better than corn syrup in the present invention. For example, such saccharides may include individual mono-, di-, oligo- and polysaccharides as well as mixtures produced either synthetically or from natural products such as vegetable starches. Furthermore, although the present experiments utilized corn syrup obtained from Cargill, Inc., there is no reason to believe that the source of corn syrup is critical to the results obtained below. Consequently, one of ordinary skill in the art will understand that the present invention encompasses the use of saccharides irrespective of source. The one or more saccharides are preferably present in the resin composition in an amount ranging from about 25 to about 65 weight percent of the resin, more preferably from about 40 to about 65 weight percent of the resin, and most preferably from about 50 to about 65 weight percent of the resin.

In one embodiment of the present invention, the resin is composed of approximately 10 weight percent Mondur 541 isocyanate; 5 weight percent 1,2-propylene glycol; and appropriate quantities of water and corn syrup necessary to create a resin having approximately sixty-five weight percent solids content. Thus, as depicted in Table 1, one method of preparing

TABLE 1

One Resin Formulation

|  | Percent by Weight of Final Composition | Percent Solids in Component | Contribution to Percent Solids in Final Composition |
|---|---|---|---|
| Mondur 541 | 10 | 100 | 10 |
| 1,2-Propylene Glycol | 5 | 100 | 5 |
| Corn Syrup | 64 | 80 | 51.2 |
| Water | 21 | 0 | 0 |
| Total Solids |  |  | 66.2 | this embodiment consists of mixing an amount of one-hundred percent solids content isocyanate equal to 10 weight percent of the final resin composition; an amount of 1,2 propylene glycol equal to 5 weight percent of the final resin composition; an amount of eighty percent solids corn syrup equal to 64 weight percent of the final resin composition; and an amount of water equal to 21 weight percent of the final resin composition. The order of mixing is discussed below.

Corn syrups of varying solids content can be utilized in the present invention. For example, as depicted in Table 2, an approximately sixty-five percent solids content resin can also be achieved by mixing an amount of one-hundred percent solids content isocyanate equal to 10

TABLE 2

Alternative Resin Formulation

|  | Percent by Weight of Final Composition | Percent Solids in Component | Contribution to Percent Solids in Final Composition |
|---|---|---|---|
| Mondur 541 | 10 | 100 | 10 |
| 1,2-Propylene Glycol | 5 | 100 | 5 |
| Corn Syrup | 74 | 70 | 51.8 |
| Water | 11 | 0 | 0 |
| Total Solids |  |  | 66.8 | weight percent of the final resin composition; an amount of 1,2-propylene glycol equal to 5 weight percent of the final resin composition; an amount of seventy percent solids corn syrup equal to 74 weight percent of the final resin composition; and an amount of water equal to 11 weight percent of the final resin composition. According to another preferred embodiment, the resin is comprised of 5 percent by weight polyol, 15 percent by weight isocyanate, 50 percent by weight of an 80 percent solids (20 percent water) corn syrup, and 30 percent by weight additional water.

While the invention is susceptible to various modifications and alternative forms, specific embodiments thereof are shown by way of example and will herein be described in detail. It should be understood, however, that the examples are not intended to limit the invention to the particular form disclosed, but on the contrary, the intention is to cover all modifications, equivalents and alternatives falling within the spirit and scope of the present invention as defined by the claims.

EXAMPLES

General Procedure for Resin Preparation

Saccharide-based resins of varying formulations were prepared from saccharide, isocyanate, 1,2-propylene glycol and water. The saccharide component of each of these resins was Cargill 80 percent solids content corn syrup. The isocyanate in each case was Mondur 541. Unless otherwise specified, the following procedure was used. First, the appropriate quantity of isocyanate was measured and poured into a blending unit. Then, the appropriate amount of 1,2-propylene glycol was measured and mixed with the isocyanate until a homogeneous appearance is observed. Next, the appropriate amount of saccharide was measured and added to the mixture. Finally, any required amount of water was measured and added to the mixture. The entire mixture was blended for thirty seconds and was then ready for use. Although different orders of mixing are within the scope of the invention, preferably the water and isocyanate are not combined without the presence of the polyol.

A urea-formaldehyde (UF) resin was used to prepare conventional particleboard samples for comparative purposes. The UF resin was a commercially available product having a 1.1:1 mole ratio of urea to formaldehyde and an approximately sixty-two percent solids content so as to correspond as closely as possible to the saccharide resins.

General Procedure for Particleboard Production

Unless otherwise specified, the processing of the fiber to make particleboard was as follows. First, an appropriate amount of comminuted Southern pine particles necessary to achieve the desired target density, which was 48 pounds per cubic foot (pcf) unless otherwise specified, was weighed and tested for moisture content on a CSC Moisture Balance. The particles were then loaded into a fiber blender and the resin was applied by pouring it onto the particles. In each case, enough resin was used to create a seven weight percent resin load—i.e., enough resin to make up seven weight percent of the final weight of the furnish. The blender was activated for a period of sixty seconds. Upon completion of blending, the resinated particles were removed and poured into a former, in which a mat was formed. The mat, supported on top and bottom by a caul plate, was then loaded into a preheated hydraulic press maintained at 350° F. The mat was compressed to the desired thickness and pressure was maintained for a period of two minutes, unless otherwise specified below. At the conclusion of the press cycle, pressure was relieved gradually so as not to disrupt the board. The boards were then allowed to cool and were cut to specified sizes for specific physical tests.

General Procedure for Analytical Testing

The finished boards were generally tested for one or more parameters. Physical strength tests consisted of measurements of internal bond, modulus of elasticity, and/or modulus of rupture. In general, higher values of internal bond, modulus of rupture and modulus of elasticity are associated with a higher quality, more robust composite product. In each case the testing of the boards was performed according to ASTM Standard D1037. Some boards were also tested for edge swelling after exposing the board to moisture.

Example 1

Several resin formulations were prepared according to the above procedure and used to prepare particleboard samples for testing. In addition, particleboard samples were prepared from the UF resin described above (hereinafter "Resin 1") for comparison testing. The formulations for Resins 2 through 7 are listed in Table 3. Each contained 80 grams of corn syrup and varying quantities ("in grams") of isocyanate, 1,2-propylene glycol, polyvinyl alcohol, and water.

Except for Resin 2, which tested the effect of adding polyvinyl alcohol to the resin, the saccharide resins each contained 10 grams of isocyanate. Resins 3, 4 and 7 differed in composition from Resins 5 and 6 in their respective concentrations of 1,2-propylene glycol and water. Resins 3, 4 and 7 each had 5 grams of 1,2-propylene glycol and 37 grams of added water whereas Resins 5 and 6 had 10 grams of 1,2-propylene glycol and a commensurately lower

TABLE 3

Resin Components Measured in Grams

| | Corn Syrup | Isocyanate | Propylene Glycol | Polyvinyl Alcohol | Water |
|---|---|---|---|---|---|
| Resin 2 | 80 | 5 | 10 | 5 | 0 |
| Resin 3 | 80 | 10 | 5 | 0 | 37 |
| Resin 4 | 80 | 10 | 5 | 0 | 37 |
| Resin 5 | 80 | 10 | 10 | 0 | 32 |
| Resin 6 | 80 | 10 | 10 | 0 | 32 |
| Resin 7 | 80 | 10 | 5 | 0 | 37 | quantity of water.

Although the compositions of Resins 3 and 4 were the same as Resin 7, they were mixed differently. The components of Resins 3 and 4 were mixed simultaneously whereas the components in Resin 7 were mixed according to the procedure described above: namely, 1,2-propylene glycol was added to the isocyanate followed by the corn syrup and then water. Resin 3 differed from Resin 4 in that particleboards prepared from Resin 3 were subjected to a two-and-one-half minute press time rather than just two minutes.

The testing of the boards was performed according to ASTM Standard D1037 and each sample was tested for internal bond strength, modulus of elasticity, and modulus of rupture. The results are depicted in Table 4. For each resin tested, multiple boards were prepared and in each case both an average and the standard deviation are reported. The raw data is provided in Appendices 1 and 2. The results of this series of testing clearly demonstrate that the saccharide resins of the present invention provide particleboard products with physical characteristics

TABLE 4

Measured Physical Properties of Particleboard Products

| Resin Used to Prepare Particleboard | Internal Bond (psi) | Modulus of Rupture (psi) | Modulus of Elasticity (psi) |
|---|---|---|---|
| Resin 1 | 69.5 ± 3.9 | 1,420.8 ± 144.9 | 349,283 ± 57,876 |
| Resin 2 | 127.2 ± 8.5 | 1,281.1 ± 360.6 | 275,507 ± 15,105 |
| Resin 3 | 181.7 ± 23.8 | 1,633.2 ± 168.9 | 291,684 ± 38,017 |
| Resin 4 | 175.1 ± 15.7 | 1,590.1 ± 20.9 | 372,365 ± 9,473 |
| Resin 5 | 87.4 ± 12.8 | 1,521.6 ± 95.8 | 379,747 ± 6,641 |
| Resin 6 | 100.8 ± 11.4 | 1,647.5 ± 15.6 | 423,825 ± 6769 |
| Resin 7 | 286.9 ± 14.6 | 2,519.8 ± 38.3 | 415,202 ± 12,273 | superior to those of boards prepared with a Resin 1, the traditional UF resin. For example, the average internal bond strength achieved from Resins 2 through 7 uniformly surpassed that achieved from Resin 1 products. Furthermore, particleboard samples prepared with Resins 3 through 7 achieved a better average modulus of elasticity and modulus of rupture than particleboards prepared with UF resin with the exception of the modulus of elasticity for the particleboard samples prepared with Resin 3.

Particleboard samples prepared from Resins 5 and 6 exhibited less desirable physical characteristics than those achieved using Resins 3, 4 and 7. For example, the average internal bond strengths of wood product prepared using Resins 3, 4 and 7 were uniformly higher than those achieved using Resins 5, and 6. Furthermore, wood product prepared using Resin 7 provided significantly higher average modulus of elasticity and modulus of rupture than wood product prepared with Resins 5 and 6. Because the difference between Resin 7 and Resins 5 and 6 was the concentration of 1,2-propylene glycol—i.e, Resin 7 had 5 grams versus 10 grams in Resins 5 and 6—it is believed that the lower 1,2-propylene glycol level in Resin 7 results in improved particleboard characteristics.

As is evident from Table 4, particleboards prepared with Resin 7 displayed significantly better physical properties than boards prepared with Resins 3 and 4. In fact, the internal bond strength for Resin 7 products was more than fifty percent higher than those observed for Resin 3 and 4 products. Because all three resins had identical compositions, this result clearly emphasizes the importance of the order of component mixing. Apparently, by mixing the corn syrup and 1,2-propylene glycol with the isocyanate prior to adding water, it is possible to mitigate the reaction between water and isocyanate. Consequently, this manner of mixing is preferred.

The results achieved for products prepared from Resins 3 and 4 were quite similar. Because these resins differed only in the press time used during the manufacture of the particleboards, there is no reason to suspect that the present resins are susceptible to small changes in the manufacturing processing such as press times.

Example 2

To test the effect of both wood product density and isocyanate concentration on the wood product physical characteristics, several additional resins were prepared. As in Example 1, each of these resins was used to create wood product and this product was compared with wood product prepared using the previously described urea-formaldehyde resin. In all cases a seven weight percent resin loading was used. Resins E and F, the urea-formaldehyde resins, were identical to the urea-formaldehyde resin described in Example 1 above. The saccharide-based resin compositions are described in Table 5. Resin A was a saccharide-based resin having approximately 23 weight percent isocyanate. Resin B, in contrast, was prepared with approximately 7.5 weight percent isocyanate.

TABLE 5

Resin Components Measured in Grams

| | Corn Syrup | Isocyanate | Propylene Glycol | Water |
|---|---|---|---|---|
| Resin A | 42.5 | 30 | 5 | 54.5 |
| Resin B | 80 | 10 | 5 | 37 |

TABLE 5-continued

Resin Components Measured in Grams

| | Corn Syrup | Isocyanate | Propylene Glycol | Water |
|---|---|---|---|---|
| Resin C | 80 | 10 | 5 | 37 |
| Resin D | 80 | 10 | 5 | 37 |

Resins C and D were identical to Resin 7 above in Example 1. However, the target densities of the particleboard products prepared with Resins C and D were different. The high density products prepared from Resin C had average densities of 49.18 pcf whereas the low density products prepared from Resin D had average densities of 44.06 pcf. Similarly, Resins E Resins C and D were identical to Resin 7 above in Example 1. However, the target densities of the particleboard products prepared with Resins C and D were different. The high density products prepared from Resin C had average densities of 49.18 pcf whereas the low density products prepared from Resin D had average densities of 44.06 pcf. Similarly, Resins E and F were identical to Resin 1 in Example 1, the UF resin. Again, the target densities of the composite wood products prepared with Resins E and F were different. The high density products prepared from Resin E had average densities of 48.16 pcf whereas the low density products prepared from Resin F had average densities of 42.96 pcf.

TABLE 6

Measured Physical Properties of Particleboards

| Resin Used to Prepare Particleboard | Modulus of Rupture (psi) | Modulus of Elasticity (psi) |
|---|---|---|
| Resin A | 1,579.3 ± 172.8 | 308,801 ± 37,570 |
| Resin B | 1,699.2 ± 82.7 | 361,845 ± 12,894 |
| Resin C | 2,098.5 ± 18.6 | 428,733 ± 20,411 |
| Resin D | 1,564.7 ± 70.5 | 311,885 ± 6,133 |
| Resin E | 1675.3 ± 102.2 | 326,640 ± 4,079 |
| Resin F | 1,263.7 ± 209.4 | 251,515 ± 42,027 |

The testing of the boards prepared in Example 2 was performed according to ASTM Standard D1037 and each sample was tested for modulus of elasticity and modulus of rupture. The results are shown in Table 6. For each resin tested, multiple boards were prepared and in each case both an average and the standard deviation are reported. The results for particleboards prepared with Resin A and Resin B demonstrate that increasing the isocyanate concentration from approximately 7.5 to approximately 23 percent by weight does not result in an improved modulus of elasticity or modulus of rupture. In fact, increasing the isocyanate concentration in the resin resulted in a particleboard product having marginally poorer physical characteristics. The improved binding at low isocyanate concentration is ideal because reducing the isocyanate concentration not only decreases the cost of the resin but also alleviates environmental, health and industrial hygiene concerns. In view of this result, a preferred embodiment resin utilizes a lower—i.e., approximately 7.5 weight percent—concentration of isocyanate.

The particleboard products manufactured from Resins C and D were prepared as high and low density products, respectively, to test the effects of product density. As a comparison, the products manufactured from Resins E and F, the UF resin formulation, were also prepared as high and low density products. As is evident from Table 6, products prepared from both the saccharide-based resin and the UF resin achieve improved physical characteristics as product density is increased. Most importantly, the quality of particleboard prepared with the saccharide-based resin is superior to that prepared with UF resin at both low and high product density.

Example 3

As a further comparison, additional particleboard products were prepared according to the earlier described method using both the previously described UF resin and the saccharide-based resin described in Table 1. In both cases, the resin load was 7 percent by weight and the target density was 48 pcf.

The testing of the boards was performed according to ASTM Standard D1037 and each sample was tested for modulus of elasticity and modulus of rupture. The results are shown in Table 7. For each resin tested, multiple boards were prepared and in each case both an average and the standard deviation are reported. The results of this series of testing again demonstrate that the saccharide-based resin achieves better quality particleboard products than a traditional UF resin. Although the properties of the product prepared with the UF resin are acceptable in the industry, it is clear that the products prepared from the saccharide-based resin are more attractive. Perhaps more importantly, though, the UF content of the former products is 7 percent of the total product weight whereas the latter products achieve superior results with an isocyanate content of only 0.7 percent of the total product weight.

TABLE 7

Measured Physical Properties of Particleboards

| Resin Used to Prepare Particleboard | Modulus of Rupture (psi) | Modulus of Elasticity (psi) |
|---|---|---|
| Table 1 Resin | 2,253.6 ± 142.8 | 439,385 ± 22,494 |
| UF Resin | 2,142.5 ± 204.8 | 381,599 ± 26,882 |

Example 4

Particleboard products prepared as in Example 3 above were wax treated and tested for swelling after exposure to moisture according to ASTM standard D1037. The results are depicted in FIG. 1 as a function of product density. The best performer—i.e., the product with the least water absorbancy as measured by swelling—was the particleboard product prepared from the saccharide-based resin. Wax-treated products prepared with the resin of the current invention displayed an edge swelling of less than 14 percent. Furthermore, the swelling was reasonably independent of product density from approximately 46 pcf to over 51 pcf. In contrast, wax-treated products prepared with the UF resin swelled more than 16 percent. In addition, this swelling was somewhat dependent of product density. Overall, then, the saccharide-based resin offers not only improved bonding, but also improved resistance to water-induced swelling.

Example 5

To demonstrate the efficacy of the saccharide-based resin in non-cellulosic applications, the composition of the resin disclosed in Table 1 was applied at a 10 percent resin load to a non-cellulosic recycled rigid polyurethane polymer that was comminuted to a small particle size. Five samples were prepared having an average density of 49.4 pcf. Other than the use of a ten percent resin load, all other preparatory procedures were identical to the method described earlier for preparation of particleboard. Prior attempts to produce a panel product from a mixture of the non-cellulosic polymer and the traditional UF resin had failed to achieve bonding. In contrast, the saccharide-based resin causes extremely strong bonding with the non-cellulosic polymer. The average internal bond strength achieved for the five samples tested were 464.5±43.9 psi, even better than the bonding achieved with lignocellulosic materials. Based upon this data, the saccharide-based resin disclosed clearly has applications outside the field of lignocellulosic and cellulosic materials.

Example 6

The saccharide-based resin disclosed in Table 1 above and the UF resin were also used to prepare medium density fiberboard (MDF) for comparative purposes. MDF fiber, unlike particleboard fiber, requires a higher level of processing to achieve high quality boards and panels. The fiber type may be attained by steam defibrillation, mechanical or chemomechanical processes and the like. A calculation was performed to yield a weight amount of furnish and resin required to form mats and subsequently, finished panels measuring 2'×2'×0.375" at 48 pcf density. Equal weight fiber amounts were then treated separately with the saccharide-based resin from Table 1 and the UF resin. The temperature, press time and pressure were the same as in the particleboard sample preparation. The mats were prepressed and then pressed to yield like thickness boards. After cooling, the boards were trimmed and evaluations began.

Ten boards were prepared from each resin and tested for internal bond strength, modulus of rupture and modulus of elasticity. The average results are compiled in Table 8. As Table 8 clearly indicates, MDF prepared from the saccharide-based resin outperformed MDF prepared from the UF resin in all categories. Average internal bond strength achieved for the MDF product prepared from the saccharide-based resin was almost three times the internal bond strength for the analogous product prepared from the UF resin. The modulus of rupture and modulus of elasticity were also significantly higher. Based on these results, the saccharide-based resin provides an MDF product that is clearly superior to the product obtained using a traditional UF resin.

TABLE 8

Measured Physical Properties of Medium Density Fiberboards

| Resin Used to Prepare MDF | Internal Bond (psi) | Modulus of Rupture (psi) | Modulus of Elasticity (psi) |
|---|---|---|---|
| Table 1 Resin | 229.9 | 5,327.5 | 492,011 |
| UF Resin | 83.4 | 3,492.5 | 434,086 |

The examples described above are provided to demonstrate the superior qualities of the resin of the present invention. The composition and products described herein are intended to be exemplary of the invention only and are not intended to limit the scope of the invention. For example, although a preferred resin embodiment utilizes a 60 percent solids content and 10 percent isocyanate, other formulations have been used successfully. For example, suitable bonding has been achieved with solids content as high as 85 percent by weight and as low as 30 percent by weight. Acceptable bonding has been achieved with resins formulated with polyol as low as 0.38 percent by weight and as high as 7.5 percent by weight of the entire resin composition.

Because the mechanism of bonding of lignocellulosic materials is in general poorly understood, it is difficult to definitively identify the chemical basis for the improvement achieved with the present invention. However, without limiting the scope of the invention, hemiacetal formation provides one plausible explanation for the enhanced bonding observed. Hemiacetals are well known as the product of the reaction between aldehydes and alcohols under acid catalyzed conditions. Lignocellulosic materials are well known to contain surface-terminal

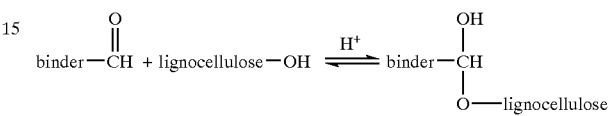

Hemiacetal formed from an aldehyde moiety from a saccharide and a surface terminal hydroxyl group in lignocellulosic material hydroxyl groups and saccharides such as corn syrup are well known to include aldehyde moieties in the form of various aldohexoses. Given the presence of catalytic levels of wood acids, it is possible that hemiacetal formation between aldehyde groups on aldohexoses and hydroxyl groups on the lignocellulosic materials allow superior bonding between the resin and the wood fibers. Linking of aldohexoses may then occur by urethane formation between the hydroxyl groups on the aldohexoses and the isocyanate moieties on the polyisocyanates. The role of the polyol appears to be to stabilize the resin by retarding the reaction between the water and the isocyanate.

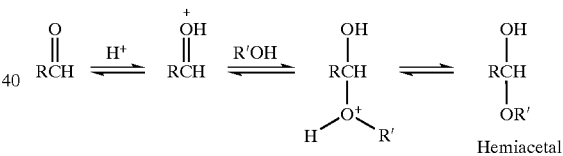

Hemiacetal

It is currently believed that the polyol acts as a surfactant and effectively separates the water and isocyanate components, thereby delaying the reaction between them.

In another embodiment, a saccharide-based resin of the present invention is used in the formation of rigid or flexible foams comprising isocyanate, for example polyurethane or polyisocyanurate foams. Typically, such foam comprises the reaction product of one or more foam polyols, one or more isocyanates, water, and optionally other additives such as catalysts, flame retardants, auxiliary blowing agents, and other known physical property modifying substances. According to the present invention, such foam further comprises a saccharide-based resin as described herein, preferably substituted for the isocyanate portion, in whole or in part, for a given foam composition. Examples of suitable isocyanates for use in foam compositions include but are not necessarily limited to those described for use in the saccharide-based resins of the present invention. In embodiments where only a portion of the isocyanate is replaced by a saccharide-based resin, the foam composition may further comprise a "foam isocyanate" comprising one or more isocyanates, preferably pure in composition, in addition to the "resin isocyanate," which is the isocyanate contained within the saccharide-based resin. The foam isocyanate may be different from or preferably is the same as the resin isocyanate.

In determining the amount and/or composition of resin to be added to a foam composition, preferably the theoretical amount of isocyanate for the foam composition is first determined, and then the amount and/or composition of the resin is selected to replace all or a portion of the isocyanate, thereby reducing the actual amount of isocyanate used to produce the foam. Formulations are typically based upon the ratio of OH equivalent groups to the N=C=O groups. The theoretical amount of isocyanate for a given foam composition may be determined, for example, by using known or predetermined foam compositions or recipes having a defined amount of isocyanate or by using known chemical relationships in foam chemistry such as the isocyanate (NCO) index, which is the ratio, expressed as a percentage, of the number of moles of isocyanate groups (NCO) to the number of moles of other chemical groups (e.g., OH, water, and $NH_2$) that react with the isocyanate groups. An NCO index of 1.05 indicates a 5-percent excess of isocyanate, while an index of 0.95 indicates a 5-percent shortfall of isocyanate. An isocyanate index of 1.00 reflects balanced stoichiometry. The presence of additional foam components such as reaction catalysts, blowing agents, flame retardants, etc. may also effect the amount and/or composition of resin to be added to a foam composition.

Suitable saccharide-based resin for use in foam may be comprised and made as disclosed herein. In a preferred embodiment, the saccharide-based resin comprises one or more saccharides (preferably corn syrup, and more preferably corn syrup having 80% solids and 20% water) in an amount from about 25 to about 65 weight percent of the resin; one or more isocyanates in an amount from greater than about 15 to less than about 100 weight percent of the resin; one or more polyols in an amount from about 1 to about 10 weight percent of the resin; and water in an amount equal to the remaining weight percent of the resin, if any. Preferably, the amount of isocyanate in the resin required to achieve a desired result is minimized. Typically, as the amount of isocyanate in the binder increases, the amount of polyol in the resin likewise increases in order to shield the isocyanate from reaction with the water in accordance with the mechanism described previously. Preferably, the components are combined in a manner as described previously herein to form the resin.

Resin polyol as used herein refers to one or more polyols that may be used in the saccharide-based resin as described herein. Foam polyol as used herein refers to one or more polyols-selected from the class of known polyols for use in reactions with isocyanates to produce foam. The foam polyol may be the same as or preferably is different from the resin polyol. In addition of the resin polyols listed previously, examples of foam polyols include but are not necessarily limited to polyetherpolyols, polyesterpolyols, polymer polyols, and the like.

Examples of the polyetherpolyol are alkylene oxide adducts of an active hydrogen compound. The active hydrogen compound includes polyhydric alcohols such as ethyleneglycol, propyleneglycol, 1,4-butanediol, 1,6-hexanediol, diethyleneglycol, triethyleneglycol, dipropyleneglycol, neopentylglycol, glycerin, trimethylolpropane, pentaerythritol, methylglycoside, sorbitol, and sucrose; polyhydric phenols such as pyrogallol, and hydroquinone; bisphenols such as bisphenol A, bisphenol S, bisphenol F, and low condensate of phenol and formaldehyde; aliphatic diamines such as propylenediamine, hexamethylenediamine, ethylenediamine, diethylenetriamine, triethylenetetramine, pentamethylenehexamine, ethanolamine, diethanolamine, triethanolamine, and aminoethylethanolamine; aromatic amines, such as aniline, phenylenediamine, xylylenediamine, methylenedianiline, and diphenyl ether diamine; alicyclic amines such as isophoronediamine, and cyclohexylenediamine; heteroalicyclic amines such as aminoethypiperazine; the aforementioned polyhydric phenols, and Mannich polyols (compounds prepared by reaction of the aforementioned aliphatic amine and formalin). Such an active hydrogen compound may be a mixture of two or more thereof. The alkylene oxide to be added to the active hydrogen compound includes ethylene oxide, propylene oxide, and butylene oxide, and combinations of two or more thereof.

The polyesterpolyol includes condensation polyesters prepared by reaction of a polybasic acid such as succinic acid, adipic acid, sebacic acid, maleic acid, dimer acids, and trimellitic acid with a polyhydric alcohol; and polylactone polyol prepared by ring-opening polymerization of epsilon-caprolactone, or the like.

The polymer polyol includes, for example, those obtained by reaction of the aforementioned polyetherpolyol with an ethylenic unsaturated monomer such as butadiene, acrylonitrile, and styrene in the presence of a radical polymerization catalyst.

The foam composition may further comprise optional known additives such as activators, catalysts or accelerants, colorants, pigments, dyes, chain-extending agents, surfactants, fillers, blowing agents, flame retardants and the like. A hydrogen atom-containing halogenated hydrocarbon, a low-boiling hydrocarbon such as pentane; and/or water may be used as a blowing agent in the production of a polyurethane foam or a polycyanurate foam with the catalyst of the present invention. The hydrogen atom-containing halogenated hydrocarbon as the blowing agent include specifically HCFC type ones such as HCFC-123, HCFC-141b, HCFC-22, and HCFC-142b; HFC type ones such as HFC-134a, HFC-245fa, HFC-245ca, and HFC-236ea; and mixtures of two or more thereof. While less favored today due to environmental restrictions, halogenated hydrocarbons such as chloroflurocarbons (CFCs) may also be used where allowed. Trichlorofluoromethane (CFC-11), methylene chloride ($CH_2Cl_2$), and 1,1,1-trichloroethane (TCA or methyl chloroform) may also be used as blowing agents.

In an embodiment, a saccharide-based resin is reacted with one or more foam polyols, preferably in the presence of a blowing agent and a reaction catalyst, to produce a foam. In a preferred embodiment, the amount of foam polyol, the amount of resin, and the resin composition are selected such that an excess of foam polyol is present in comparison to the actual amount of isocyanate in the foam composition, that is the isocyanate index for the foam composition is less than 1.00.

In a preferred embodiment, the foam polyol is pre-mixed with one or more catalysts, one or more blowing agents, and any other optional additives, and such pre-mixed polyols may be purchased commercially or prepared on site as part of the overall foam manufacturing process. The pre-mixed foam polyol is then admixed to the resin (for example in a mixing vessel or head), and the mixture is laid down to form a foam. For example, the foam may be laid down via slabstock foam manufacturing methods to produce a foam bun or by molded foam manufacturing methods to form a molded foam article. Various end use articles having insulative and/or cushioning properties may be made from the foam, for example furniture and bedding cushioning, automotive components such as dashboard or seating cushioning and cab insulation, and construction components such as rigid foam sheets and carpet underlayments. The foam composition may be adjusted to produce desired foams having physical properties (e.g., rigidity, flammability, compressibility, friability, density, etc.) that are specific to a particular end use.

Foam Examples

Example 7

A saccharide-based resin comprising 50 weight percent Mondur 541 isocyanate; 5 weight percent 1,2-propylene glycol; 30 weight percent of an 80 percent solids (20 percent water) corn syrup; and 15 weight percent additional water was prepared in accordance with the General Procedure for Resin Preparation described previously. 20 grams of a commercially available foam polyol having a catalyst and a blowing agent pre-mixed therein was admixed to 30 grams of the saccharide-based resin in glass container. The composition was stirred vigorously by hand with a glass rod until a homogenous blend was observed, approximately 15 to 30 seconds, at which time stirring was stopped and the composition was allowed to foam in the mixing container.

Example 8

A saccharide-based resin and foam was prepared as described with Example 7, except that the 1,2-propylene glycol in the resin was replaced by an equal amount of isononyl phthalate.

Comparative Example 9

A comparative foam was prepared as described in Example 7, except that the blended resin was replaced by an equal amount of pure Mondur 541 isocyanate such that the foam comprised the reaction product of 30 grams of Mondur 541 isocyanate with 20 grams of the commercially available polyol.

Foaming of the composition in Example 7 was observed within about 3 to 8 seconds after mixing was stopped. Foam of the composition in Example 8 occurred less rapidly than in Example 7, possibly due to the absence of a blowing agent and/or catalyst. As is known in the art, the rate and initiation of foaming may be modified via the use of additives such as catalysts/accelerants, blowing agents, etc.

Upon visual and hand inspection, Examples 7 and 8 produced satisfactory foams. The foam of Example 8 was less rigid than the foam of Example 7, which was very similar to while slightly less rigid than the foam of the Comparative Example 9. The final weight of the foam produced in Examples 7 and 8 (i.e., 42 grams) was the same as the final weight of the comparative foam (i.e., 42 grams), which indicates an equivalent extent of reaction and equivalent loss due to off gases such as carbon dioxide while using only half as much isocyanate. That is, 15 grams of isocyanate in Examples 7 and 8 yielded an equivalent 42 grams of foam having physical properties similar to the comparative foam made from 30 grams of isocyanate. Such a result has economic benefits in that isocyanate is often the most expensive component in foam and environmental and industrial hygiene benefits in the reduction of toxic isocyanates.

The foregoing detailed description and examples have been given for clarity of understanding only. No unnecessary limitations are to be understood therefrom. While preferred embodiments of the present invention have been shown and described, it will be understood that variations can be made to the preferred embodiments without departing from the scope of, and which were equivalent to, the present invention.

What is claimed is:

1. A foam prepared from a resin comprising:
   a. one or more saccharides;
   b. one or more isocyanates;
   c. one or more resin polyols; and
   d. water,
   wherein the one or more polyols comprise 1,2-propoylene glycol.

2. The foam of claim 1 wherein the foam is a polyurethane foam.

3. The foam of claim 2 wherein the polyurethane foam is flexible.

4. The foam of claim 2 wherein the polyurethane foam is rigid.

5. The foam of claim 1 wherein the one or more saccharides comprise from about 25 to about 65 weight percent of the resin; the one or more isocyanates comprise from greater than about 15 to less than about 100 weight percent of the resin; the one or more resin polyols comprise in an amount from about 1 to about 10 weight percent of the resin, and the water comprises any remaining weight percent of the resin.

6. The foam of claim 1 wherein the one or more saccharides comprise a polysaccharide.

7. The foam of claim 6 wherein the polysaccharide comprises corn syrup.

8. The foam of claim 1 wherein the one or more isocyanates comprise a polyisocyanate.

9. The resin of claim 8 wherein the polyisocyanate comprises a diphenylmethane diisocyanate.

10. The foam of claim 1 further comprising the reaction product of one or more foam polyols with the resin.

11. The foam of claim 10 having an isocyanate index of less than about 100.

12. The foam of claim 10 wherein the reaction product further comprises one or more catalysts, one or more blowing agents, or both.

13. A method for preparing a foam comprising:
   (A) forming a resin by:
      a. mixing one or mare saccharides with one or more isocyanates; and
      b. then mixing the one or more saccharides and the one or more isocyanates with water; and
   (B) admixing one or more foam polyols to the resin,
   wherein the one or more polyols comprise 1,2-propylene glycol.

14. The method of claim 13 wherein the one or more saccharides comprise a polysaccharide.

15. The method of claim 14 wherein the polysaccharide comprises corn syrup.

16. The method of claim 13 further comprising mixing the one or more isocyanates with one or more resin polyols prior to step (a).

17. A method for manufacturing a foam derived from an isocyanate, comprising replacing all or a portion of the isocyanate with a resin comprising:
   a. one or more saccharides;
   b. one or mare isocyanates;
   c. one or more resin polyols; and
   d. water,
   wherein the one or more polyols comprise 1,2-propylene glycol.

18. An article of manufacture comprising a foam prepared from a resin comprising:
a. one or more saccharides;
b. one or more isocyanates;
c. one or more resin polyols; and
d. water,
wherein the one or more polyols comprise 1,2-propylene glycol.

19. The article of manufacture of claim 18 wherein said article is a rigid foam sheet suitable for use in construction of a structure.

20. In a composition of matter derived from an isocyanate reaction, replacing all or a portion of the isocyanate with a rain comprising one or more saccharides and 1.2-propylene glycol.

21. The method of claim 20 wherein the one or more saccharides react to form a hemiacetal prior to the isocyanate reaction.

22. The method of claim 20 wherein the resin further comprises one or more isocyanates and water.

23. The method of claim 20 wherein the composition of matter is foam.

24. In a process for manufacturing foam from the reaction of an isocyanate with a polyol, forming a hemiacetal from one or more saccharides added to the foam prior to the reaction of the isocyanate and the polyol, wherein the one or more polyols comprises 1,2-propylene glycol.

25. Polyurethane foam comprising one or more saccharides and one or more polyols, wherein the one or more polyols comprise 1,2-propylene glycol.

* * * * *